Jan. 11, 1966   G. NEWTON ETAL   3,229,013
PREPARATION OF TIRES
Filed Nov. 5, 1962   3 Sheets-Sheet 1

INVENTORS
GUY NEWTON
HAROLD G. SCHWARTZ

Jan. 11, 1966  G. NEWTON ETAL  3,229,013
PREPARATION OF TIRES
Filed Nov. 5, 1962  3 Sheets-Sheet 2

INVENTORS
GUY NEWTON
HAROLD G. SCHWARTZ

INVENTORS
GUY NEWTON
HAROLD G. SCHWARTZ united States Patent Office 3,229,013
Patented Jan. 11, 1966

3,229,013
PREPARATION OF TIRES
Guy Newton, Cuyahoga Falls, and Harold G. Schwartz, Akron, Ohio, assignors to E. I. du Pont de Nemours and Company, Wilmington, Del., a corporation of Delaware
Filed Nov. 5, 1962, Ser. No. 236,186
9 Claims. (Cl. 264—229)

This application is a continuation-in-part of our copending application Serial No. 12,038, filed March 1, 1960.

This invention relates to a process for preparing a pneumatic tire and more particularly to a flow molding process for preparing such tires.

Conventional processes for manufacturing pneumatic tires require laborious, expensive hand-building of multiply carcasses on a drum to which tread stocks are subsequently attached. The presence of numerous layers of rubberized fabric gives rise to non-uniformity within each carcass and the many positioning and stitching operations required make reproducibility very difficult.

It is an object of the present invention to provide a process for making a pneumatic tire. A further object is to provide a process for making a more uniform pneumatic tire utilizing a flow molding technique for preparing a tire drum carcass. A still further object is to provide a process for flow molding an unbagged tire drum carcass consisting of a homogeneous body of an uncured elastomer having tire cords and bead elements disposed therein. Another object is to provide a novel mold suitable for flow molding a pneumatic tire drum carcass. Other objects will appear hereinafter.

These and other objects of this invention are accomplished by the process for preparing a cured pneumatic tire which comprises introducing a curable fluid elastomer composition into a drum-shaped mold cavity, the volume of said cavity being defined by the surface of a mandrel and the inner surface of shell elements completely enclosing said mandrel, the inner surface of said shell elements having recesses corresponding to the tread area of the ultimate pneumatic tire, said mold cavity having a plurality of filamentous elements disposed therein under tension between peripheral bead elements positioned at the ends of said mandrel; allowing said curable fluid elastomer composition to form a solid plastic drum-shaped composite article containing said bead and filamentous elements; removing said composite article from said mandrel; forcing said composite article under pressure into the shape of a tire, followed by a curing step to produce a cured pneumatic tire.

Figure 1:
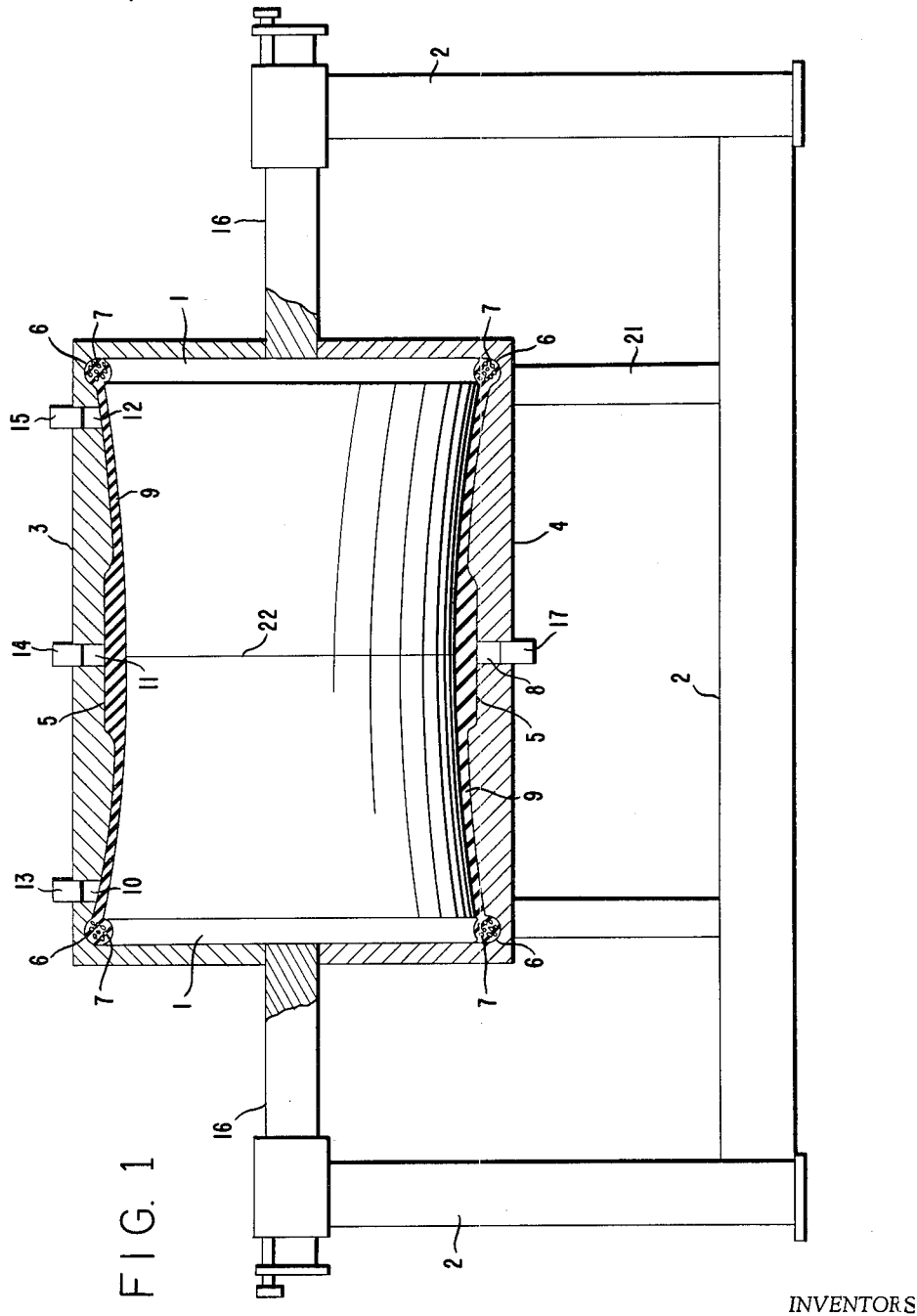
Figure 2:
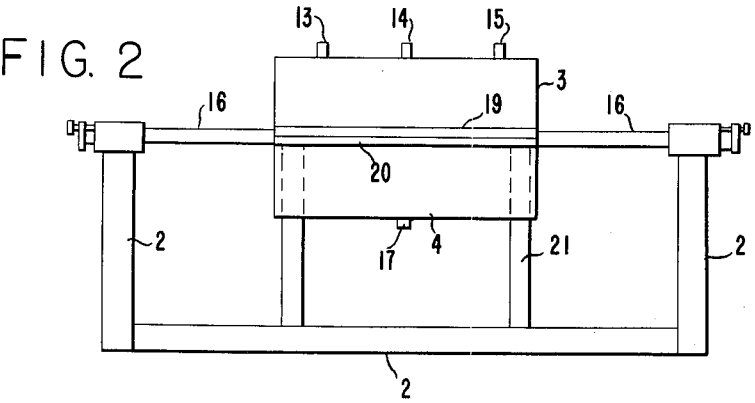
Figure 3:
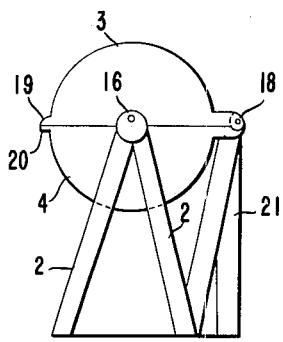
Figure 4:
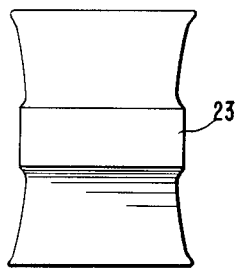
Figure 5:
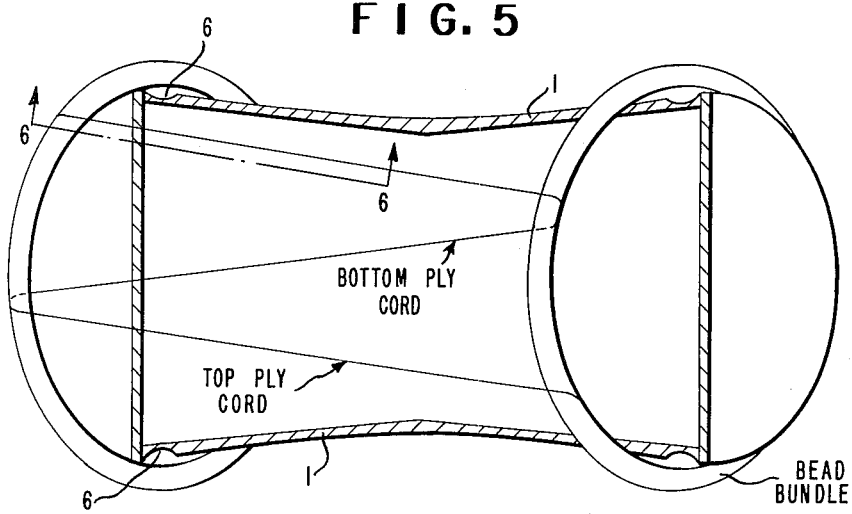
Figure 6:
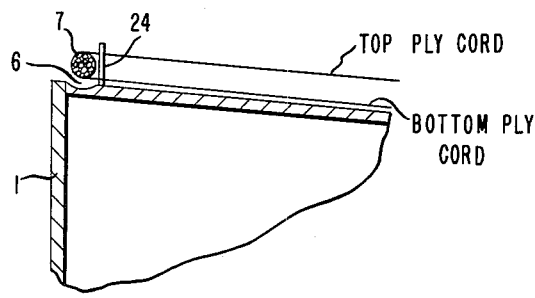
Figure 7:
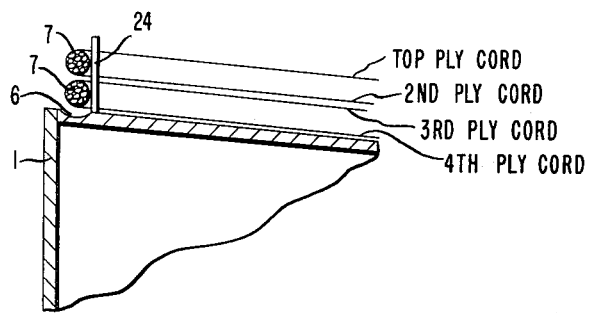

The invention is more particularly described below and this description is intended to be read with reference to the accompanying drawings wherein:

FIGURE 1 is a cross-sectional view of the tire carcass mold, FIGURE 2 is an exterior front-side view of the entire tire carcass mold assembly, FIGURE 3 is an exterior end view of the tire carcass mold assembly, FIGURE 4 is an exterior front side view of the unshaped tire drum carcass after it is removed from the mold, FIGURE 5 is an exterior longitudinal view (at a slight angle) of the tire carcass mold showing the arrangement of beads and cords as they would be positioned on the mandrel (which mandrel is shown in cross-section) for making a 2-ply bias carcass, FIGURE 6 is a cross-section along the line 6—6 showing how the cords in a 2-ply carcass are separated from each other as well as from the mandrel surface and FIGURE 7 is the same angle cross-section as FIGURE 6 except it shows how the cords are separated from each other and the mandrel surface in a 4-ply system.

In carrying out the process of this invention, a generally cylindrical mold assembly having a drum-shaped cavity is used and bead and filamentous elements are disposed within this cavity. It is generally desirable that this cavity contain indentations which will correspond to the tread area of the ultimate pneumatic tire which is to be formed. A curable fluid elastomer composition is then introduced under pressure into the base of the mold cavity whereby it contacts the bead elements and filamentous elements and completely displaces the air within the cavity. The tire drum carcass is substantially formed when this fluid elastomer sets to a plastic solid state forming a homogeneous mass having the bead and filamentous elements disposed therein. After the tire drum carcass has acquired sufficient strength it is removed from the mold and subsequently shaped to the form of the tire and cured. It is apparent from this general description that the tire drum carcass is prepared by a flow molding technique. This technique provides, in a relatively convenient and inexpensive manner, a more uniform product which can be easily reproduced. The ultimate tire desired is made by shaping and curing this tire drum carcass by any of the conventional techniques which are familiar to those skilled in the art.

In carrying out the process of the present invention any fluid material may be used which can be converted into a strong plastic solid and subsequently cured to an elastomer. In fact the material employed may be a solid at room temperature provided that it becomes sufficiently fluid at a suitable processing temperature to be forced into the mold in a fluid condition. Thus, heat may be applied or, in some instances, plasticizers may be added to the material when necessary in order to increase its fluid characteristics prior to loading into the mold. The curable material must be fluid enough during the flow molding operation to be pumped through the feed lines into the base of the mold and to fill the mold cavity completely thereafter. In order to get a strong tire it is particularly important that there be no voids in the molded drum carcass. The curable material must, therefore, fill all the free space in the mold cavity. In addition, the curable material must coat the entire surface of each filamentous element disposed within the mold cavity (except for that portion of the filaments touching the bead elements).

Since heat generally accelerates the curing of the curable material, the tendency for high loading temperatures to lower the viscosity will be opposed by the eventual development of extensive cross-linking. Materials suitable for use in the subject invention can be loaded into the mold before the cross-linking proceeds far enough to prohibit satisfactory pumping and loading. Unsatisfactory materials cure too rapidly to permit their viscosity to be reduced to satisfactory values.

The suitable operating temperature will depend upon the elastomer system contemplated. It may range between room temperature and about 160° C.; frequently it lies between about 120° C. and 150° C. The temperature will be selected so that the curable material is sufficiently fluid to be pumped and loaded easily but not so high that undue cross-linking or decomposition occurs.

Representative examples of curable fluid elastomeric compositions which may be used in the process of this invention include mixtures of amines and epoxide-terminated polyalkyleneether polyurethanes as described in U.S. Patent 2,830,038; mixtures of a polytetramethyleneether glycol and 1,3-bis(3-isocyanato-p-tolyl)urea as described in U.S. Patent 2,858,298; mixtures of polyurethane diamines and epoxy resins as described in U.S. Patent 2,888,439; mixtures of polyester polyols and polyisocyanates as described by Bayer et al. in "Rubber Chemistry and Technology," vol. 23, pp. 812–835; mixtures of polyester polyurethanes and N,N'-β-dihydroxyethyl urea as described in U.S. Patent 2,822,349; mixtures of polyisocyanate-modified polyesters and glycols as described in U.S. Patent 2,729,618; mixtures of polyisocyanate-modified polyesters and diamines or aminoalcohols as described in U.S. Patent 2,620,516; mixtures of isocyanate-terminated polyalkyleneether polyurethanes and aliphatic polyols as described in British Patent 733,624; mixtures of isocyanate-terminated polyalkyleneether-thioether glycols and diamines or diols as described in U.S. Patent 2,917,489; mixtures of isocyanate-terminated polyalkyleneether polyurethane compounds, an acid-reacting substance, and an organic compound containing a plurality of active hydrogen atoms as described in British Patent 796,044; depolymerized rubber (e.g., as described in British Patent 662,106); and the liquid polyurethane compositions described in U.S. Patent 3,061,574.

Depending on the particular fluid composition employed, it will be apparent to those skilled in the art that various processing additives and curing agents may be added to these compositions. The curing agents used will depend upon the nature of the material being cured. Thus amines or amine-terminated polymers will be particularly suitable for epoxy compounds. Polyisocyanates will be useful for curing hydroxyl-terminated polymers such as polyester polyols and polyalkyleneether glycols. Agents containing a plurality of active hydrogen groups (that is, containing groups such as amido, amino, arsinico, arsino, arsono, arsylene, carbamyl, diazoamino, hydrozion, hydrazo, hydrazono, hydroxamino, hydroxyl, imido, imino, isonitro, isonitroso, mercapto, nitramino, oxamyl, phosphinico, phosphino, phosphono, silinino, selenono, silenyl, semicarbazido, silicono, silicyl, silicylene, stannyl, stibinico, stibino, stibono, stibylene, sulfamino, sulfamyl, sulfino, sulfo, sulfonamido, thiocarbamyl, triazeno, ureido and urethaneo) can be used with isocyanate-terminated polymers. When fluid materials containing curable ethylenic unsaturation are used for making the tire drum carcass, curing agents such as sulfur and dicumyl peroxide can be employed.

The properties of the cured tires may be varied by suitable compounding ingredients such as carbon black, silica, esterified silica, calcium carbonate, talc, magnesium oxide, magnesium carbonate, zinc oxide, titanium dioxide, and other fillers. Inorganic and organic coloring agents may be used so as to give well-defined colors. The curable composition is compounded with these materials before it is introduced into the mold. The maximum amount of filler permissible will be governed by the properties desired in the cured tire and by the need for fluidity during the filling of the mold. Conventional devices such as 3-roll ink mills can be employed for introducing the compounding ingredients into the curable compositions.

The mold assembly which is used in the process of the present invention for flow molding of the tire drum carcass comprises in general a mandrel and elements suitable for enclosure of the same. These elements may be conveniently made up of a pair of shells pivoted in a clam-like fashion on a common bearing. Initially, these shells are swung apart to gain access to the mandrel. Later, they are securely clamped together. The mold in which the tire carcass is formed has a drum-shaped cavity. Generally, there are indentations in this cavity corresponding to the tread area of the ultimate tire; however, they may be omitted, if desired. There is usually an annular indentation at each end of the mold cavity where the tire beads are fixed. There is a port at the base of the mold leading to the cavity and there are openings at the top of gas escape. The dimensions of the mold may be varied in accordance with the general practices of the trade for determining the particular dimensions of tire drum carcasses needed for particular types of pneumatic tires.

The mold itself may be made from aluminum, steel, reinforced plastic, or any other material which is dimensionally stable during the operation of the process. It is usually desirable to treat the inside surfaces with a mold release agent, such as a high-melting wax, in order to facilitate removal of the tire drum carcass.

The filamentous elements (tire cords) are positioned and fixed in the mold prior to the introduction of the curable fluid elastomer composition and the formation of the tire drum carcass. This is a particularly valuable feature of the present process. The tire cords are stretched between beads fixed at the ends of the mandrel. The shape of these beads is not critical. As is well known to those skilled in the art, beads can be constructed to suit the application for which the tire is intended. Passenger car tires, heavy duty truck tires, etc., will each call for different types of beads. The separation of the cord elements from the mandrel surface requires that the beads be positioned above the surface. As is shown by FIGURES 5, 6 and 7, the bead support serves to provide this spacing. Each pair of beads (one bead at each end of the mandrel) can support one or two layers of fabric "plies." The cord elements are wrapped around the beads in the manner indicated. The vertical thickness of the beads is made great enough to keep the upper and lower cords from touching each other in the mold being used. When more than two plies are used, there will be a pair of beads for each pair of plies. FIGURE 7 shows a representative arrangement for a 4-ply tire. In general, the bead supports keep the beads far enough apart so that adjacent plies do not touch each other. The tire cords can be made from any of the materials familiar to the trade such as polyesters (e.g., polyethyleneterephthalate), cotton, rayon, nylon, or steel cable. Unlike conventional practice, the cords are not rubberized prior to use; however, they may be treated to improve their adhesion to the elastomer in which they are subsequently embedded. Thus they may be coated with heat reactive phenolic compounds such as the resins made by reacting 0.5 to 2.0 mols of formaldehyde with resorcinol under neutral or basic conditions. As many layers of fabric can be positioned as desired. Generally, there are at least two layers. All filaments are parallel in each layer and the direction of each successive layer is reversed. The cords can be positioned normal to the beads or they can be placed at a bias so that the value of the crown angle in the tire can range from 0° to a value as high as 45° for specialized applications. In any case, the principles familiar to those skilled in the art of designing conventional cord ply built tires may be employed here for selecting the proper cord angle needed for the performance desired of the tire. Familiar principles, too, may be utilized in determining the proper drum width which is a function of the cord angle.

If a crown angle of 0° is desired a cord can be wrapped around the bead assembly at 0°. When crown angles above 0° are wanted, the cord can be wrapped at 0° and the proper bias angle obtained by counter-rotation of bead elements in each assembly; compensation for proper bead spacing is necessarily included.

The tire cords can be applied as strips of conventional tire cord fabric which have been cut at the desired bias angle. Alternatively, a continuous cord can be wrapped around the beads at the proper bias angle and tensioned so they will not sag or distort. Conventional en counts (number of cords/inch of periphery) are used. They will be determined by the type of cord being employed and the strength desired for the tire.

After the tire cords have been positioned, the mold is closed and the fluid elastomer is introduced at the bottom of the cavity. As the liquid level rises the air within the cavity is displaced through vents at the top of the mold. The cords surrounded by the fluid subsequently become embedded in a homogeneous body of solid elastomer. The portions of the cord directly against the beads are not coated with the fluid, as mentioned above.

In order that the cords be coated with elastomer the cords must be kept from contacting the surface of the mold and each other. The cords are wrapped around the bead wires positioned above the surface. If a zero bias angle is selected, a flat mandrel will accordingly be satisfactory. However, if the cords are positioned at a bias, a flat mandrel is unsatisfactory because the cords may be forced to touch the mandrel at the center in spite of the elevation of the beads; the distance from cord to surface will vary throughout the path of each cord. A concave mandrel is used, therefore, except when the bias angle is zero. The degree of concavity will depend upon the bias angle selected; the greater the bias the greater the concavity and vice versa.

After the curable fluid elastomeric composition has been introduced into the mold, the entire assembly is allowed to stand until the composition is converted to a solid plastic state. The chemical nature of the fluid composition will determine the conditions of time and temperature needed to obtain the plastic solid state. These conditions can readily be determined by those skilled in the art. When the temperature is too low, the drum-shaped tire carcass obtained may not be plastic enough to be shaped satisfactorily by the Bag-O-Matic press. When the temperature is too high, the fluid composition may tend to gel in the pump. The processibility of the drum-shaped tire carcass depends also on the hold time in the mold. If the time is too short, the fluid elastomer is not sufficiently gelled to permit ready removal of the carcass from the mandrel. If the time is too long, the carcass cannot be shaped satisfactorily by the Bag-O-Matic press; rupture of the side-walls may occur exposing the tire cords disposed therein. In general, it will probably be preferred to heat the entire mold assembly to a temperature from about 70° C. to about 160° C. (frequently about 120° C. to 150° C.) for a period of time of from about a half hour to several hours in order to achieve the plastic solid state. When heat is to be applied in order to convert the fluid composition to the plastic solid state, it may be desirable to preheat both the mold and the curable fluid elastomeric composition in order that the conversion may be accomplished within a reasonable length of time. It is obvious that the mold must be preheated if the curable composition is a solid or is exceedingly viscous below the temperature at which it is being pumped; otherwise, the composition will "freeze up" in the lower part of the mold cavity and prevent complete loading.

Heat can be applied by suitable heating jackets around the outer shells. The mandrel can be hollow and heated by such conventional means as steam or electricity. The mold assembly, when desired, can be transferred to a heated zone, such as an oven when desired.

After the curable fluid elastomeric composition is converted to the plastic solid state, the mold is opened and the drum-shaped tire carcass removed therefrom. It is convenient to use a two-piece mandrel which can be drawn apart at the center. The tire drum carcass is freed from the mold by removing the elements fixing the beads to the mandrel and then pulling the mandrel halves apart. It is generally desirable to mold this drum-shaped tire carcass into the form of a conventional tire as soon as it has been removed from the mold. It is to be understood that the drum-shaped tire carcass may be permitted to cool to room temperature or it may be stored at some intermediate temperature. The conventional tire shape is given to the drum-shaped tire carcass by the usual bagging operation employing the Bag-O-Matic press. The conventional bagging operations are quite familiar to those skilled in the art and are described in "The Story of the Tire," published by The Goodyear Tire and Rubber Company, 12th ed. (1948) page 31, and "Introduction to Rubber Technology," page 22, figure 1.10. After the drum-shaped tire carcass has been converted to conventional tire shape, the resulting tire is then curved by heating. It will be apparent to those skilled in the art that the time and temperature required to effect the cure will, of course, depend upon the fluid elastomeric composition employed, as well as the curing agents and accelerators being used. In general, curing is effected by heating at a temperature of from about 80° C. to 180° C., frequently about 100 to 160° C., for a period of time of from 0.5 hour to 24 hours, frequently 0.5 to 6 hours.

The process of the present invention as described above utilizes a rigid mold from which the drum-shaped tire carcass is removed and subsequently shaped into the form of a tire and cured in a separate apparatus. It is to be understood, however, that, when desired, the mandrel used in forming the drum-shaped tire carcass may be made of an elastomeric material. In this instance, after the drum-shaped tire carcass has been formed, the assembly enclosing the drum may be replaced by a conventional shaping and curing apparatus. In this instance, the elastomeric mandrel serves as an air bag or diaphragm and functions in a manner familiar to those skilled in the Bag-O-Matic art.

FIGURE 1 shows a cross sectional view of the tire carcass mold and assembly. A mandrel 1 comprising two halves, which are capable of being separated along line 22, is supported on a shaft 16 which in turn is supported by a frame 2. The mandrel is enclosed by clam-type shells 3 and 4, which shells are joined axially by a shaft 18 as shown in FIGURE 3. There is a circumferential indentation 5 in the center of shells 3 and 4 to correspond to the tread section of the ultimate tire. Peripheral indentations 6 at the ends of mandrel 1 and in shell elements 3 and 4 allow for the space taken by the bead wire elements 7. A valve 8 at the bottom of the lower shell 4 contains a port through which the curable fluid elastomer composition is introduced into the mold cavity 9. The elastomer composition enters the mold assembly through a pipe 17. Upper shell 3 contains openings 10, 11 and 12 through which air and excess elastomer composition escape from the mold assembly through standpipes 13, 14 and 15.

FIGURE 2 is an exterior front view of the tire carcass mold assembly. Flanges 19 and 20 are used to clamp shell elements 3 and 4 firmly together during the molding operation.

FIGURE 3, which is an exterior end view of the mold assembly, shows framework 21 which supports shaft 18.

FIGURE 4 is an exterior front view of the tire drum carcass after it is removed from the mold but prior to its being formed into the shape of a tire. The portion of this carcass which becomes the tread area of the ultimate tire is shown at 23, this portion corresponding to identation 5 in the shells. Formation of this carcass into a tire by means of Bag-O-Matic press is quite conventional as described above.

FIGURE 5 is an exterior longitudinal view, at a slight angle, of the tire carcass mold. Bead bundles, corresponding to bead wire elements 7 are positioned at the peripheral indentations 6 at the ends of mandrel 1, shown in cross-section. The cord is then wrapped around one of the bead bundles, is taken across the surface of the mandrel and is then wrapped around the other bead bundle and taken back across the mandrel surface to the first bead bundle. This process is repeated, with adjustments being made to obtain the desired spacing between the cords, so as to substantially completely cover the mandrel surface with the cord. Separation between the top and bottom plies is determined by the thickness of the bead bundel.

FIGURE 6 is a cross-section along line 6—6 of FIGURE 5 showing how the cords are separated in a 2-ply system. The cord is wrapped around bead wire element 7. A bead pin 24 keeps the bead element 7 positioned in the peripheral indentation 6. This pin may be removed after the tire drum carcass has been formed.

FIGURE 7 is quite like FIGURE 6 except that it shows a 4-ply arangement wherein it is necessary to employ two bead elements.

The following example will better illustrate the nature of the present invention; however, the invention is not intended to be limited to this example. Parts are by weight unless otherwise indicated.

EXAMPLE

(A) *Preparation of isocyanate-terminated polyurethane polymer A*

278.7 parts of toluene-2,4-diisocyanate and 1000 parts of anhydrous polytetramethyleneether glycol of molecular weight 1000 are agitated at 80° C. for 4 hours in a dry reaction vessel protected from atmospheric moisture. Polymer A thus obtained has a free isocyanate content of 4.2%, a Brookfield viscosity at 30° C. of about 16,500 cps., and a number average molecular weight of about 2000.

(B) *Mold assembly*

The tire carcass mold assembly employed is depicted in FIGURES 1, 2 and 3.

(C) *Positioning the tire cords*

Upper shell element 3 is raised and lower shell element 4 is lowered to gain access to mandrel 1. The mandrel is separated into two halves along line 22 and by moving shaft 16 away from the center line and rubberized bead wire bundles 7 are slipped over each half of the mandrel and positioned in the peripheral indentations 6. Shaft 16 is then moved toward the center to bring the two halves of the mandred together along line 22 as depicted in FIGURE 1.

Nylon tire ply fabric is cut on a bias angle of 26.5 degrees. The cord network is then wrapped around the bead wire bundles 7. Initially the cords are slipped under the beads, then one end of the cord is wrapped over a bead, on the one end, laid across the concave center portion of the mandrel and tucked over and under a bead bundle on the other end. The other end of the cord is wrapped over a bead bundle and taken across the mandrel in an opposite direction and tucked over and under the bead bundle on the other end.

After the tire cords have been positioned, a cementing material made by mixing polychloroprene and toluene-2,4-diisocyanate is applied to the fabric plies secured around the bead bundles. Shells 3 and 4 are then clamped together by flanges 19 and 20. If desired, pins may be inserted through shell elements 3 and 4 near the bead bundles in order to fix them more securely.

(D) *Molding the tire carcass mold assembly*

The mold assembly containing the tire cord is preheated at 140° C. for about one hour.

Polymer A (containing 20 percent by weight of dioctyl phthalate) and 4,4'-methylene-bis(2-chloroaniline) are separately pumped at 140° C. to an on-off basket mixer of the type described in U.S. Patent 2,868,518. The mixture obtained, which has the following composition (parts are by weight): 100 parts of Polymer A, 20 parts of dicotyl phthalate, and 15 parts of 4,4'-methylene-bis-(2-chloroaniline), passes directly through pipe 17 leading to the base of the mold cavity 1. There it enters mold cavity 1 through valve 8. When the fluid composition appears in the standpipes 13, 14 and 15 at the top of the assembly, the flow is shut off.

The whole assembly is then placed in a 140° C. oven. After one-half hour the assembly is withdrawn from the oven and opened as quickly as possible. The assembly is opened by raising shell 3 and lowering shell 4, to gain access to mandrel 1. The bead bundles 7 are slipped over the indentations at the end of mandrel 1 and the mandrel is separated slowly along line 22 by pulling the mandrel halves apart. The drum-shaped tire carcass, as shown in FIGURE 4, is removed from the mandrel.

After 4 hours the drum-shaped carcass is placed in a Bag-O-Matic press, shaped into a tire form and cured at 140° C. for 30 minutes. Water at room temperature is circulated through the mold for 5 minutes. The cured tire is then removed from the press.

As many widely different embodiments of this invention may be made without departing from the spirit and scope thereof, it is to be understood that this invention is not limited to be specific embodiments thereof except as defined in the appended claims.

What is claimed is:

1. A process for preparing a cured pneumatic tire which comprises disposing bead elements at respective opposite ends of a mandrel, positioning a plurality of non-rubberized filamentous elements under tension between said peripheral bead elements, said filamentous elements being positioned so that they are out of contact with the surface of said mandrel and are separated from each other, said filamentous elements being positioned with respect to said bead elements so that the valve of the crown angle in the ultimate pneumatic tire ranges from 0° to 45°; placing said mandrel within a mold so as to form therewith a drum-shaped mold cavity, said mold comprising shell elements which completely enclose said mandrel with the inner surface of said shell elements having recesses corresponding to the tread area of the ultimate pneumatic tire; introducing a curable fluid elastomer composition into said drum-shaped mold cavity; allowing said elastomer composition to form a homogeneous solid plastic drum-shaped composite article containing said bead and filamentous elements, with substantially the entire surface of said filamentous elements being coated with said elastomer composition; removing said composite article from said mold cavity; forcing said composite article under pressure into the shape of a tire; followed by a curing step to produce a cured pneumatic tire.

2. The process of claim 1 characterized in that said mandrel has a concave surface with each filamentous element being positioned at a bias relative to said peripheral bead elements.

3. The process of claim 1 wherein the curable fluid elastomer composition contains an isocyanate-terminated polyurethane polymer.

4. The process of claim 3 wherein the isocyanate-terminated polurethane polymer is obtained from a polyalkyleneether glycol and an organic diisocyanate.

5. The process of claim 4 wherein the polyalkyleneether glycol is a polytetramethyleneether glycol and the organic diisocyanate is toluene-2,4-diisocyanate.

6. The process of claim 3 wherein the elastomer composition contains a curing agent.

7. The process of claim 6 wherein the curing agent is 4,4-methylene-bis(2-chloroaniline).

8. The process of claim 3 wherein the isocyanate-terminated polyurethane polymer is obtained from a polyester polyol and an organic polyisocyanate.

9. The process of claim 6 wherein the curing step is carried out at a temperature of about 140° C.

References Cited by the Examiner
UNITED STATES PATENTS

| | | | |
|---|---|---|---|
| 2,569,935 | 10/1951 | Leguillon et al. | 264—279 |
| 2,650,633 | 9/1953 | Eger | 264—271 |
| 2,724,425 | 11/1955 | Ostling | 156—125 |
| 2,757,701 | 8/1956 | Henson. | |
| 2,860,379 | 11/1958 | Beckadolph et al. | 264—278 |
| 2,925,623 | 2/1960 | Beckadolph | 264—271 |
| 3,114,598 | 12/1963 | Beckadolph et al. | 264—277 |

ROBERT F. WHITE, *Primary Examiner.*
ALEXANDER H. BRODMERKEL, *Examiner.*